United States Patent
Wasmund et al.

(10) Patent No.: US 6,692,719 B1
(45) Date of Patent: Feb. 17, 2004

(54) PROCESS FOR REGENERATION OF ACID HALIDE SOLUTIONS

(75) Inventors: Bert Wasmund, Mississauga (CA); Kamal Adham, Mississauga (CA)

(73) Assignee: Hatch Ltd., Mississauga (CA)

(*) Notice: Subject to any disclaimer, the term of this patent is extended or adjusted under 35 U.S.C. 154(b) by 56 days.

(21) Appl. No.: 09/707,988

(22) Filed: Nov. 8, 2000

(51) Int. Cl.[7] ............... C22B 3/10; C01B 7/03; C23G 1/36; C23F 1/46
(52) U.S. Cl. ............... 423/481; 423/488; 423/83; 423/633; 423/639; 423/594.19; 423/DIG. 1
(58) Field of Search ............... 423/481, 488, 423/83, 633, DIG. 1, 639, 635, 594.19

(56) References Cited

U.S. PATENT DOCUMENTS

| | | | | |
|---|---|---|---|---|
| 3,399,964 A | * | 9/1968 | Michels et al. | 423/488 |
| 3,682,592 A | * | 8/1972 | Kovacs | 423/488 |
| 3,752,883 A | * | 8/1973 | Moore, Jr. | 423/481 |
| 3,852,430 A | * | 12/1974 | Lienau et al. | 423/481 |
| 4,107,267 A | * | 8/1978 | Hansen | 423/493 |
| 4,197,139 A | * | 4/1980 | Hjersted | 423/DIG. 1 |
| 4,214,901 A | | 7/1980 | Michal et al. | 423/139 |
| 4,919,715 A | | 4/1990 | Smith et al. | 423/29 |
| 5,149,515 A | | 9/1992 | Karner et al. | 423/393 |
| 5,846,510 A | | 12/1998 | Hollitt et al. | 423/488 |
| 5,980,850 A | | 11/1999 | Lebl | 423/488 |
| 6,030,433 A | | 2/2000 | Luggenhorst et al. | 423/107 |
| 6,210,650 B1 | * | 4/2001 | Karner et al. | 423/488 |

FOREIGN PATENT DOCUMENTS

| | | |
|---|---|---|
| DE | 35 44 978 | 6/1987 |
| DE | 100 06 990 | 9/2000 |
| EP | 0 635 586 | 1/1995 |
| JP | 59142833 | 8/1984 |
| WO | WO93/10038 | 5/1993 |
| WO | WO96/27554 | 9/1996 |

OTHER PUBLICATIONS

Database WPI, Section Ch, Week 199219, Derwent Publications Ltd., London, GB; AN 1992–155251, XP002204143.
Translation of Japanese Patent Document 59142833. Aug. 1984.
Translation of German Patent Document DE 3544978 A1.

* cited by examiner

Primary Examiner—Ngoc-Yen Nguyen
(74) Attorney, Agent, or Firm—Ridout & Maybee LLP (57) ABSTRACT

A process is disclosed for regenerating an aqueous acid halide leachant from a spent aqueous metal halide leach liquor. The process comprises introducing into a fluidized bed or spray roaster a hydrocarbon fuel, an oxygen-enriched oxidizing gas and the aqueous metal halide leach liquor; pyrohydrolyzing the aqueous metal halide leach liquor by combustion of the hydrocarbon fuel with the oxygen-enriched oxidizing gas to produce an acid halide-containing gas fraction and a metal oxide-containing solid fraction; separating the gas fraction from the solid fraction, recovering heat energy from the acid halide-containing gas fraction and absorbing the gas fraction in water to produce the aqueous acid halide leachant. The oxygen-enriched oxidizing gas has an oxygen concentration of greater than about 21 percent by volume, preferably greater than about 50 percent by volume, more preferably greater than about 80 percent by volume, and even more preferably greater than about 90 percent by volume. Preferably, the aqueous metal halide is iron (II) chloride or nickel chloride. Despite higher costs associated with the oxygen-enriched oxidizing gas as compared to air, the process is capable of being operated more economically and efficiently than an equivalent air roasting pyrohydrolysis, and produces a higher concentration aqueous halide leach liquor, which is preferred in metallurgical processes such as solvent extraction and solids leaching.

21 Claims, 6 Drawing Sheets

PROCESS FOR REGENERATION OF ACID HALIDE SOLUTIONS

FIELD OF THE INVENTION

This invention relates to processes for regeneration of acid halide solutions for leaching and digestion of ores for recovery of mineral products, or for use in cleaning metallic products such as steel sheets. In particular, the invention relates to a process for regenerating an aqueous hydrohalic acid solution from pyrohydrolysis of an aqueous metal halide solution in an oxygen-enriched atmosphere.

BACKGROUND OF THE INVENTION

The use of hydrohalic acids, primarily hydrochloric acid and hydrofluoric acid, for leaching and digestion of ores for mineral recovery has recently become more prevalent. This may partially be due to the development of acid resistant plastic which has made it feasible to transport hydrohalic acids, and due to the fact that they are better suited to the leaching and digestion of some types of ores than other acids such as sulfuric acid.

Leaching processes utilizing hydrohalic acids generate large amounts of spent aqueous metal halide leach liquors which must be dealt with. Processes for recovery of acid halides from spent leach liquors have been developed in which the leach liquor is hydrolyzed at an elevated temperature (i.e. "pyrohydrolyzed") in an air roaster. The pyrohydrolysis process involves passing the spent aqueous halide leach liquors into the roaster to generate a solid metal oxide and an off-gas containing hydrogen halide and water vapor. The hydrogen halide produced by the pyrohydrolysis is recovered by absorption in water to form a regenerated hydrohalic acid solution which can then be used to leach or digest more ore.

The pyrohydrolysis process can be represented by the following formulae where the halide is chloride:

$$C_nH_m + (n+m/4)O_2 \rightarrow nCO_2 + (m/2)H_2O$$

$$MeCl_x + (x/2)H_2O \rightarrow MeO_{x/2} + xHCl$$

$$H_2O(l) \rightarrow H_2O(g)$$

In order to provide the required energy to evaporate the spent aqueous halide leach liquor and provide an elevated temperature for the pyrohydrolysis to occur, existing roasters burn a hydrocarbon fuel in air. In addition to hydrogen halide gas and water generated by pyrohydrolysis of the leach liquor, the off-gas also contains gases produced by combustion of the hydrocarbon fuel, including carbon dioxide and nitrogen. In fact, the off-gas can contain 50 to 70% nitrogen, depending on the type of fuel and the concentration of the feed halide solution.

Present day air roasting processes have made gains in energy efficiency by recovering much of the sensible heat from the roaster off-gas, such that the portion of the off-gas which is discharged to the atmosphere is cooled to about 100° C. This is accomplished by contacting the off-gas with fresh halide leach liquor, resulting in heating of the halide leach liquor and cooling of the off-gas. In addition, flow of the hot off-gas over the fresh halide solution results in partial evaporation and concentration of the halide solution. Dilution water (at ambient temperature) is added to the halide solution prior to pyrohydrolysis to compensate for evaporation and to prevent crystallization of metal salts which would cause blockages in the process equipment.

Thus, while presently used air roasting processes are relatively energy efficient due to heat recovery from the off-gas, it would be desirable to make the roasting process even more energy efficient.

SUMMARY OF THE INVENTION

The present invention overcomes at least some of the problems of the prior art discussed above by providing a process for forming an aqueous hydrohalic acid solution by pyrohydrolysis of a spent aqueous metal halide leach liquor in an air roaster, in which the energy requirements for pyrohydrolysis are provided by combustion of a hydrocarbon fuel with an oxygen-enriched gas. The terms "oxygen-enriched gas" and "oxygen-enriched oxidizing gas" as used herein refer to a gas for combustion in which the concentration of oxygen is greater than the concentration of oxygen in air, which is about 21 percent by volume.

A given volume of an oxygen-enriched gas is smaller in total volume than a given volume of air having the same oxygen content. Thus, the use of an oxygen-enriched gas in place of air reduces the volume of gas required to burn the hydrocarbon fuel in the roaster, and also results in a corresponding decrease in the amount of combustion off-gas produced by combustion of the fuel. The reduced volume of the off-gas results in a number of benefits. For example, the smaller gas volumes permits the use of smaller, less costly process equipment. Also, the off-gas contains a higher concentration of hydrogen halide gas, resulting in a more concentrated hydrohalic acid solution after absorption of the gas in water. Further, since some heat energy is lost in the off-gas released to the atmosphere, reducing the off-gas volume also improves the energy efficiency of the process.

The inventors have also identified some additional benefits of reducing the off-gas volume which are not readily apparent. These additional benefits relate to the effect of the off-gas volume on the volume of the incoming feed solution that can be processed. As mentioned above, recovery of heat energy from the roaster off-gas is accomplished by contacting the off-gas with fresh halide leach liquor, resulting in partial evaporation and concentration of the halide solution. The evaporated water is entrained in the off-gas and is subsequently released to the atmosphere, taking with it some heat energy. Dilution water is added to the halide solution to replace the water evaporated from the halide solution and to prevent crystallization of the metal salts in the solution. Thus, the latent heat required to evaporate the dilution water, which is considerable, represents energy which is wasted.

Furthermore, some of the oxide produced in the roaster is entrained as dust in the off-gas. The oxide dust is absorbed in the venturi by the fresh halide solution, thus increasing the concentration of the metal in the solution, and increasing the need for dilution water to prevent crystallization.

Having identified these problems associated with air roasting, the inventors have found that reducing the off-gas volume reduces the amount of evaporation of the fresh halide feed solution and also reduces the amount of entrained oxide dust in the off-gas, thereby significantly reducing the amount of dilution water which must be added to the halide solution to prevent crystallization. The reduced need for dilution water represents a significant gain in energy efficiency, making the use of oxygen-enriched gas more energy efficient and less costly than a corresponding air roasting process. The lack of appreciation of these benefits by others in this field may account for the fact that oxygen-enriched gas has not previously been used for roasting of metal halide solutions.

Another reason why oxygen-enriched roasting of halides has not been attempted is that it may have been believed that increasing the amount of oxygen in the oxidizing gas could result in excessive oxidation of the metal halides, leading to undesirable side products such as chlorine gas. The inventors have not detected increased amounts of such side products in the process of the invention.

In one aspect, the present invention provides a process for forming an aqueous acid halide-containing leachant from a spent aqueous metal halide leach liquor, comprising: (a) introducing into a roaster a hydrocarbon fuel, an oxygen-enriched oxidizing gas and said aqueous metal halide leach liquor; (b) pyrohydrolyzing the aqueous metal halide leach liquor in said roaster by combustion of said hydrocarbon fuel with said oxygen-enriched oxidizing gas to produce an acid halide-containing gas fraction and a metal oxide-containing solid fraction; (c) separating the gas fraction from the solid fraction; (d) recovering heat energy from the gas fraction; and (e) absorbing the gas fraction in water to produce said aqueous acid halide leachant.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 1:
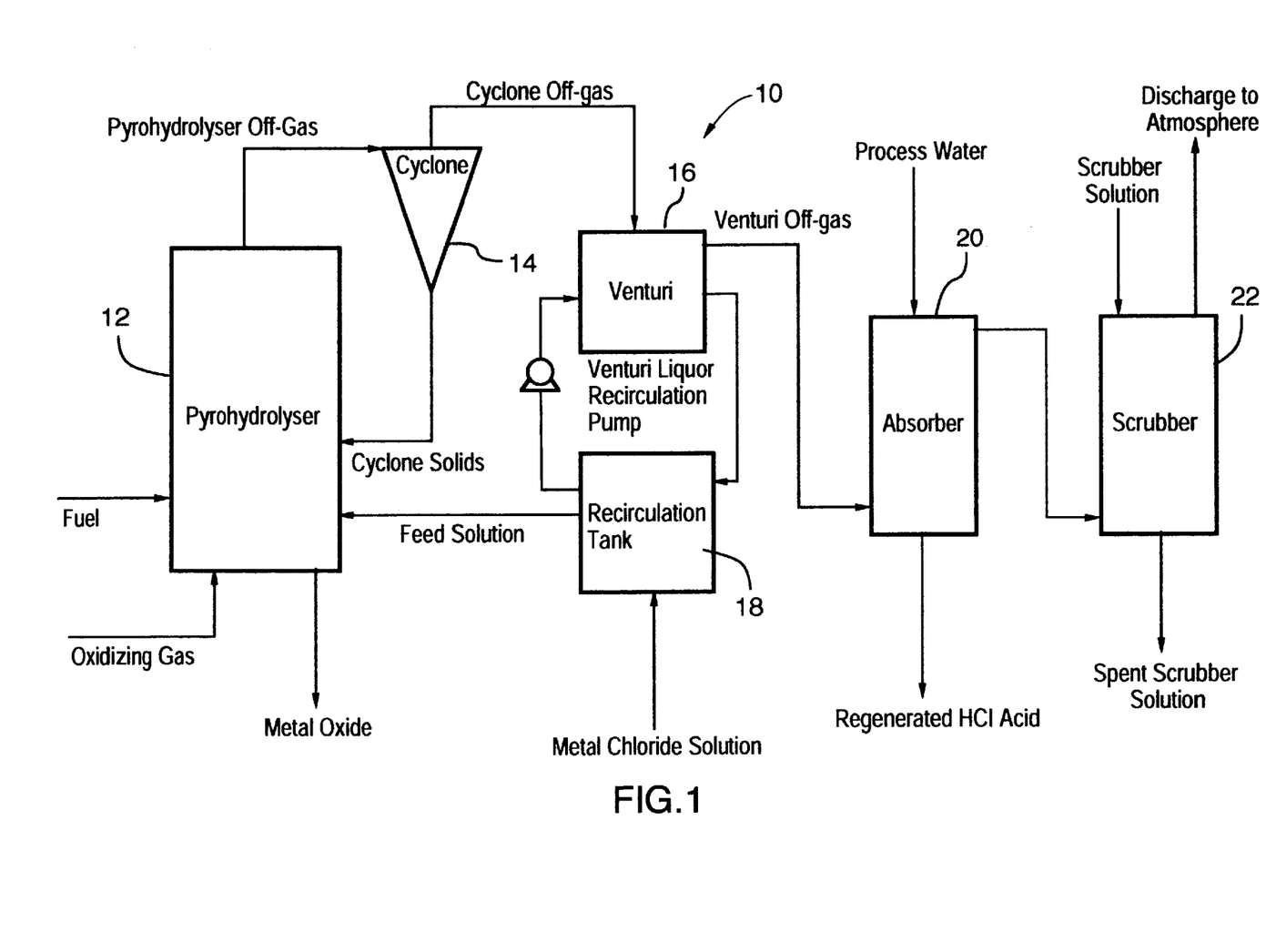
FIG. 1 is a flow diagram generally illustrating the process and apparatus for operating the process of the present invention.
Figure 2:
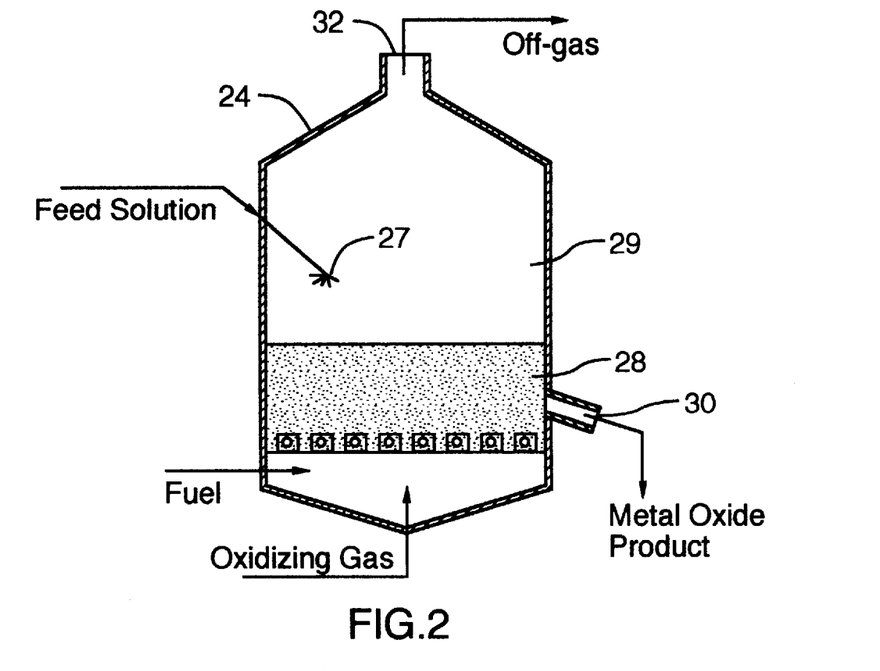
FIG. 2 is a schematic diagram of a preferred fluidized bed roaster for use in the process of the present invention.
Figure 3:
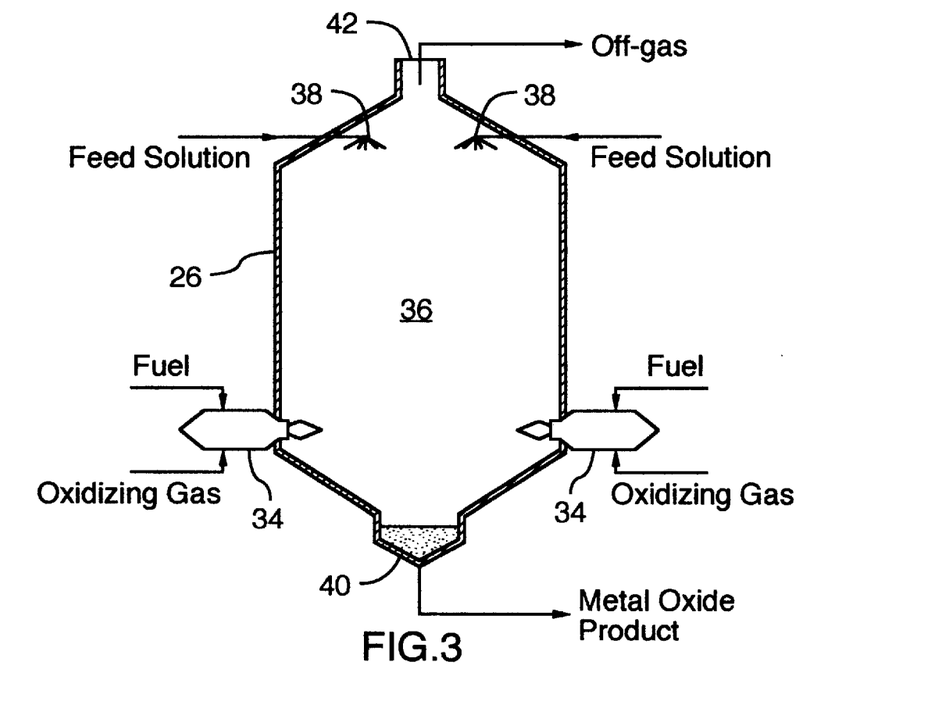
FIG. 3 is a schematic diagram of a preferred spray roaster for use in the process of the present invention.

A preferred process and apparatus for oxygen-enriched pyrohydrolysis are now discussed with reference to FIGS. 1 to 3. FIG. 1 is a flow diagram of an apparatus for use in a preferred process according to the present invention, and FIGS. 2 and 3 illustrate preferred types of roasters for use in the preferred process of the invention.

The apparatus 10 according to the invention comprises a roaster 12 (also referred to as a "pyrohydrolyser") in which the pyrohydrolysis of the aqueous metal halide solution (also referred to herein as the "feed solution") takes place, a cyclone 14 in which solids such as metal oxides are separated from the off-gas, a direct contact venturi off-gas cooler and cleaner 16 in which fresh feed solution is sprayed onto the off-gas from the cyclone 14 in order to cool the off-gas and heat the feed solution, a separator 18 (also referred to as a "recirculation tank") in which gas and liquid mist from the venturi device 16 are separated, a counter-current absorption tower 20 in which the cooled off-gas (at about 100° C.) from the venturi device 16 is absorbed into water to form an acidic solution, and a scrubber 22 to clean the waste gases discharged to the atmosphere.

The feed solution to be pyrohyrolyzed according to the process of the invention preferably comprises metal cations selected from one or more members of the group comprising iron, nickel, magnesium, calcium, cobalt and mixtures thereof. The feed solution also preferably comprises halide anions selected from the group comprising chloride, fluoride and mixtures thereof. More preferably, the feed solution comprises a solution of one or more metal halides selected from the group comprising iron (II) chloride, iron (II) fluoride, nickel chloride, magnesium chloride, calcium chloride or cobalt chloride.

According to the preferred process, the feed solution is fed to separator 18, from which it is circulated to the venturi device 16 for heating, resulting in partial evaporation and concentration of the feed solution. The heated, concentrated feed solution is then fed from the separator 18 to the roaster 12.

The roaster 12 preferably comprises either a fluidized bed roaster 24 as illustrated in FIG. 2 or a spray roaster 26 as illustrated in FIG. 3.

In the fluidized bed roaster 24, a hydrocarbon fuel is burned in a hot bed 28 of metal oxides located in a lower portion of the roaster. The oxide bed 28 is maintained in a fluid state by the action of the hydrocarbon fuel and the oxygen-enriched oxidizing gas fed into the roaster 24, and by the action of the gases produced by combustion of the fuel. The feed solution is introduced into an upper freeboard section 29 of roaster 24, located above the oxide bed 28, through injection lances 27 as shown in FIG. 2, or alternatively at the level of the oxide bed (not shown). The pyrohydrolysis reaction inside the roaster 24 converts the metal halide in the feed solution into a solid metal oxide, which is collected and later discharged from the oxide bed 28 at outlet 30. The off-gas produced by pyrohydrolysis of the feed solution exits through outlet 32 located at the top of the roaster 24.

In the spray roaster 26 shown in FIG. 3, a hydrocarbon fuel is burned in one or several burners 34 which are located in a lower portion of roaster 26 and are fed with the oxygen-enriched oxidizing gas. As shown in the drawing, the burners 34 are mounted to the side of a spray chamber 36 into which droplets of the feed solution are mechanically sprayed through sprayers 38 located above burners 34. The high temperature combustion gases produced by the burners 34 cause drying of the liquid droplets and reaction of the metal halides therein to produce solid metal oxides and gaseous hydrogen halides. The solid metal oxides are collected and removed at the base 40 of spray chamber 36, and the off-gas containing hydrogen halide exits the spray chamber 36 through outlet 42.

Although the conversion and fuel efficiency are normally better for spray roasters due to lower off-gas volume and lower temperature, the inventors have found that it is preferred, in some embodiments of the invention, to utilize a fluid bed roaster which can produce an oxide product with less residual chloride and denser particle structure which is better suited for storage and shipping.

Regardless of the type of roaster used in the process of the invention, the oxidizing gas fed to the roaster is oxygen-enriched relative to air, containing greater than about 25% oxygen by volume. Preferably, the oxygen-enriched gas contains at least about 50% by volume oxygen, more preferably at least about 80% by volume oxygen, and may preferably be at least about 95% by volume oxygen. The greater the concentration of oxygen in the oxidizing gas, the greater will be the benefits of the volume reduction achieved by the process of the present invention. For example, the inventors have found that the use of an oxidizing gas comprising 96% by volume oxygen, which is produced by large scale cryogenic plants, can result in a higher concentration hydrohalic acid solution at a comparable or lesser cost than can be obtained in a conventional air roaster.

The off-gas from the roaster 12 passes to the venturi device 16 in which it is quenched with recirculated feed solution from the separator 18. The quenching of the off-gas lowers its temperature to about 100° C., thereby transferring most of its sensible heat to the incoming feed solution, which is thereby heated and partially evaporated and concentrated prior to being fed to the roaster 12.

In air roasting, the venturi dust dissolves in the concentrating feed solution and increases its concentration to above the saturation limit. Therefore, dilution water must typically be added to the feed solution in order to prevent crystallization and equipment plugging in the venturi. Oxygen-enriched roasting according to the invention alleviates this problem by both lowering the amount of evaporation in the venturi, due to the lower flow of hot off-gas, and by lowering the dust metal oxide flow to the venturi, due to the lower solids carry-over in the less voluminous off-gas. The present invention thereby reduces or eliminates crystallization in the venturi and the need to add dilution water to the feed solution.

The quenched off-gas is passed from the venturi device 16 to absorption tower 20 where the acid-containing vapor is absorbed in water. Due to the higher concentration of hydrohalic acid in the off-gas, a stronger acid solution is produced than can be obtained in an air roasting process. In fact, the inventors have found that the process of the invention produces a solution having a hydrohalic acid concentration of about 280 to 300 g/L, which is 10 to 20 percent (on a weight/volume basis) greater than that produced by conventional air roasting. As mentioned above, this is particularly advantageous in metallurgical processes such as solvent extraction and solids leaching.

The benefits of the present invention are further illustrated by the following examples.

EXAMPLES

The following examples compare oxygen-enriched roasting to air roasting in fluidized bed and spray roasters. Nickel chloride ($NiCl_2$) is used as a model metal chloride, whose pyrohydrolysis is used for recovering nickel metal, as for example in U.S. Pat. No. 4,214,901 to Fekete. A commercial process modeling software (Metsim) is used to calculate the heat and mass balances for each example.

For examples 1 through 4, 1.0 metric tonne per hour of saturated nickel chloride solution at 40° C. (594 g/l of $NiCl_2$) is used as the fresh process feed. For fuel, methane ($CH_4$) is burned in the required stoichiometric amount of oxygen or air to maintain the roaster temperature (850° C. for fluid bed and 400° C. for spray roaster). For simplicity, the following assumptions are made:

All units are well insulated and heat losses are negligibly small.

Dust loading of the roaster's cyclone off-gas is 30 grams of NiO per $Nm^3$ of gas, which is to be expected in typical industrial installations. This is to account for the fine NiO dust that will escape the roaster via the off-gas and cannot be separated in the cyclone.

The absorber tower operates at a uniform temperature of 85° C. and produces the regenerated HCl acid at its maximum theoretically possible concentration.

The composition of the venturi liquor is maintained at 46% $NiCl_2$ by weight (the saturation point for $NiCl_2$ at about 100° C.), by adding dilution water to the feed nickel solution. Crystallization of $NiCl_2$ will occur at venturi liquor concentrations above 46 weight % $NiCl_2$, and cause blockages in the process equipment.

Examples 1 through 4 serve to show that the pyrohydrolyser fuel consumption is strongly affected by any addition of dilution water, which is often required for controlling the venturi liquor concentration at or below its saturation point. Oxygen-enrichment is shown to:

Lower the quantity of roaster off-gas, by eliminating most of the nitrogen, which results in:
   Less evaporation in the venturi resulting in less dilution water requirement and more fuel efficiency.
   Lower off-gas volume resulting in smaller roaster and off-gas treatment system.

Increase the pyrohydrolyser efficiency (conversion of $NiCl_2$ to NiO product) by carrying less NiO dust from the roaster to the venturi via the roaster off-gas. As mentioned above, the NiO dust increases the metal concentration of the halide feed solution, further increasing the need for dilution water. Thus, the process of the invention lowers or eliminates the need for dilution water addition and lowers the fuel consumption rate. Pyrohydrolyser conversion is defined as the ratio of NiO product to total NiO produced, including NiO dust in the roaster's cyclone off-gas.

Increase HCl concentration in the off-gas, by eliminating most of the nitrogen.

Increase HCl concentration in the regenerated acid, due to the higher HCl content of the off-gas going to the absorber.

Example 1

Fluid Bed Air Roasting

Figure 4:
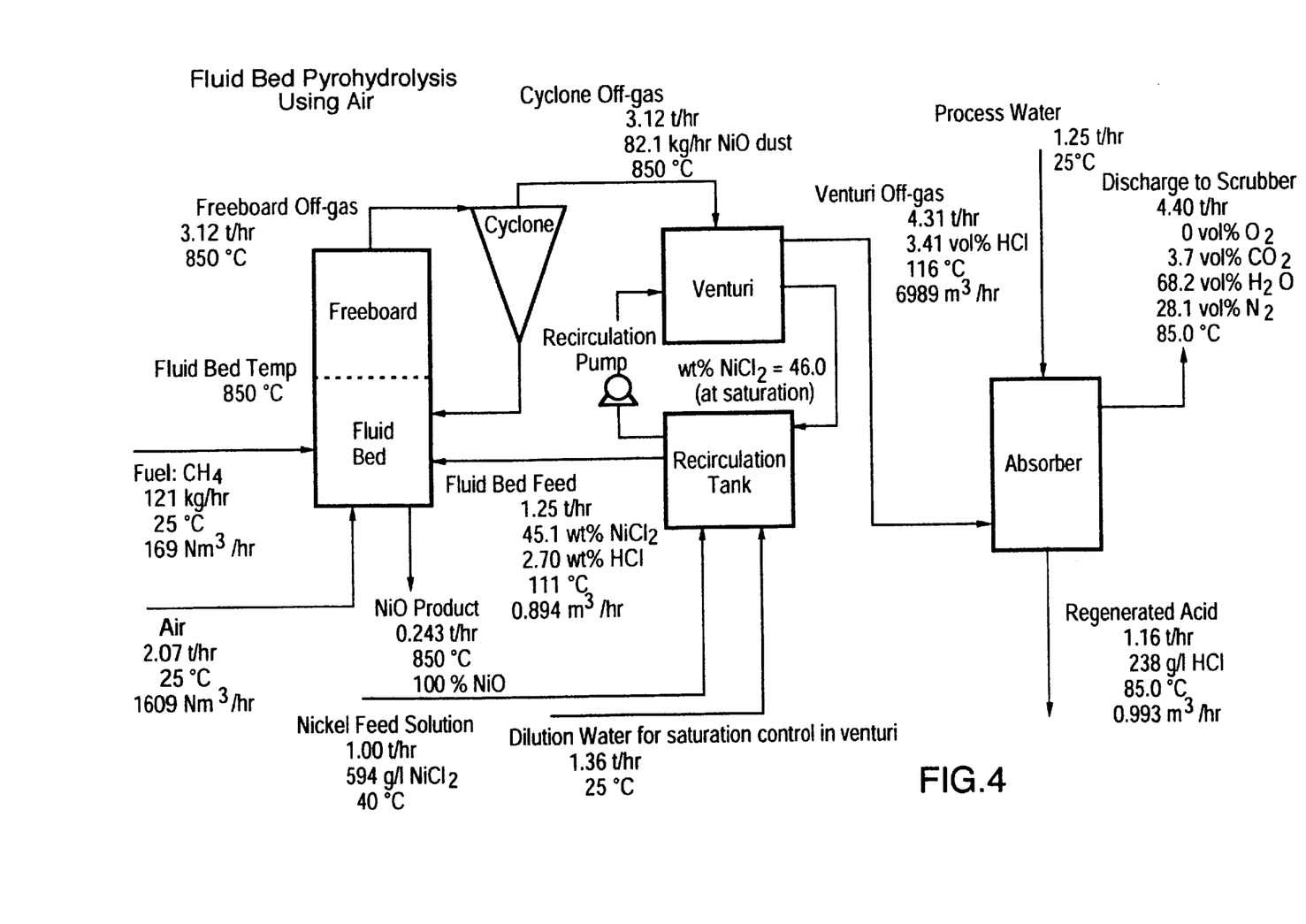
FIG. 4 is a flow diagram illustrating a prior art process and apparatus for fluidized bed pyrohydrolysis using air as the oxidizing gas, as exemplified by Example 1.

One metric tonne per hour of saturated nickel chloride solution at 40° C. (594 g/l of $NiCl_2$) is fed into the process illustrated in FIG. 4. Methane ($CH_4$) is burned in the required stoichiometric amount of air to maintain a roaster temperature of 850° C. The pyrohydrolysis reactions are:

$$CH_4 + O_2 \rightarrow CO_2 + 2H_2O$$

$$H_2O(l) \rightarrow H_2O(g)$$

$$NiCl_2 + H_2O \rightarrow NiO + 2HCl$$

It is found that 121 kg/hr of fuel, 1,609 $Nm^3$/hr of air and 1,360 kg/hr of dilution water are required to produce 243 kg/hr of NiO. The pyrohydrolyser conversion is 74.7%. The venturi off-gas contains 3.41% HCl by volume and the corresponding regenerated acid concentration is 238 g/l HCl. The operating conditions and product compositions are summarized in Table 1.

Example 2

Fluid Bed Oxygen-enriched Roasting

The same nickel solution as used in Example 1 is fed into an oxygen-enriched fluid bed roaster. The fluid bed is also maintained at 850° C. by burning methane ($CH_4$), however a 96% oxygen/4% nitrogen mixture is used instead of air (refer to FIG. 5). The pyrohydrolysis reactions are listed in Example 1.

Figure 5:
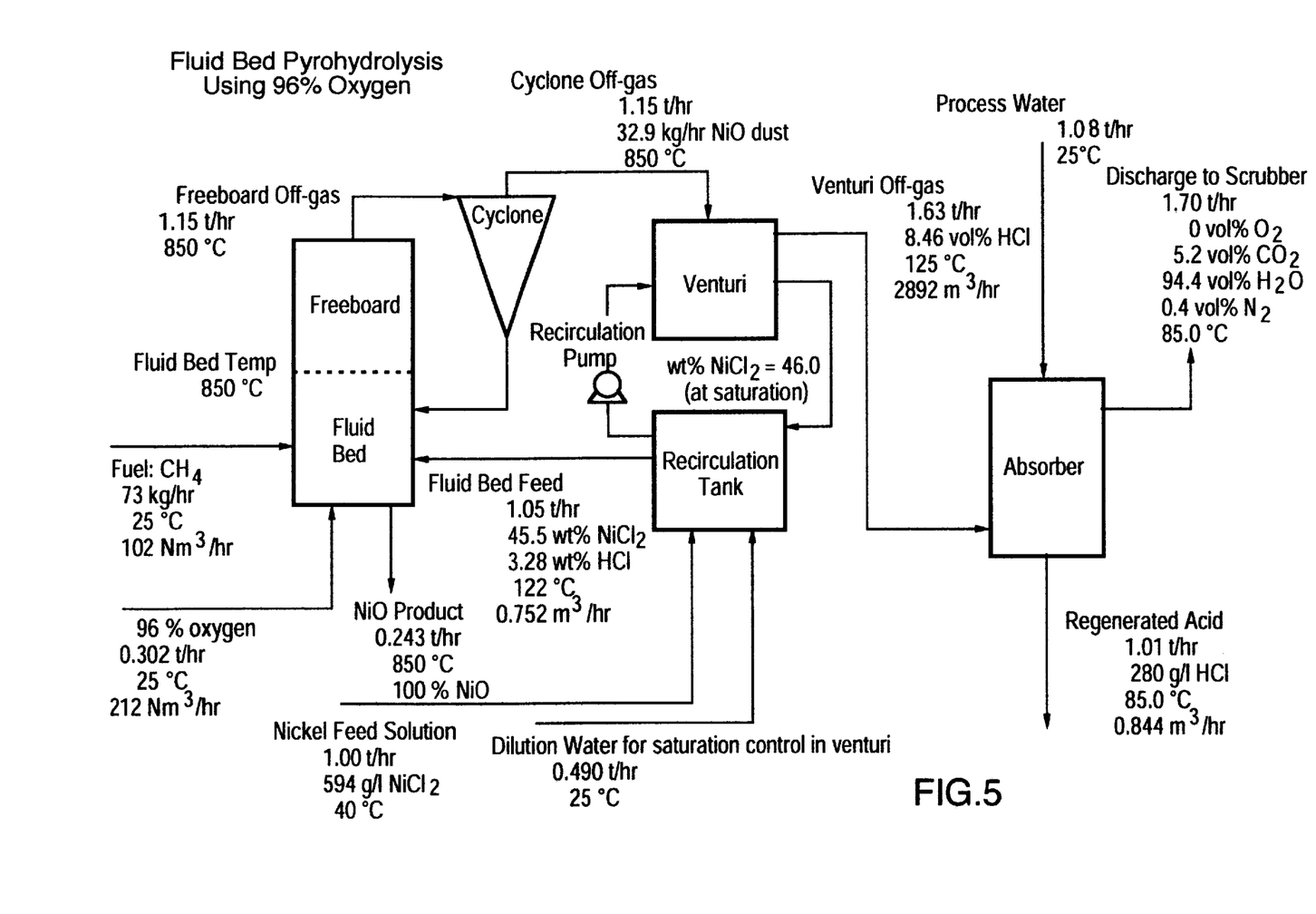
FIG. 5 is a flow diagram illustrating a process and apparatus according to the invention for fluidized bed pyrohydrolysis using an oxygen-enriched oxidizing gas, as exemplified by Example 2.

It is found that 73 kg/hr of fuel, 212 Nm$^3$/hr of 96% oxygen and 490 kg/hr of dilution water are required to produce 243 kg/hr of NiO. The pyrohydrolyser conversion is 88.1%. The venturi off-gas contains 8.46% HCl by volume and the corresponding regenerated acid concentration is 280 g/l HCl. The operating conditions and product compositions are summarized and compared to those from Example 1 in Table 1.

Example 3
Spray Roasting in Air

Figure 6:
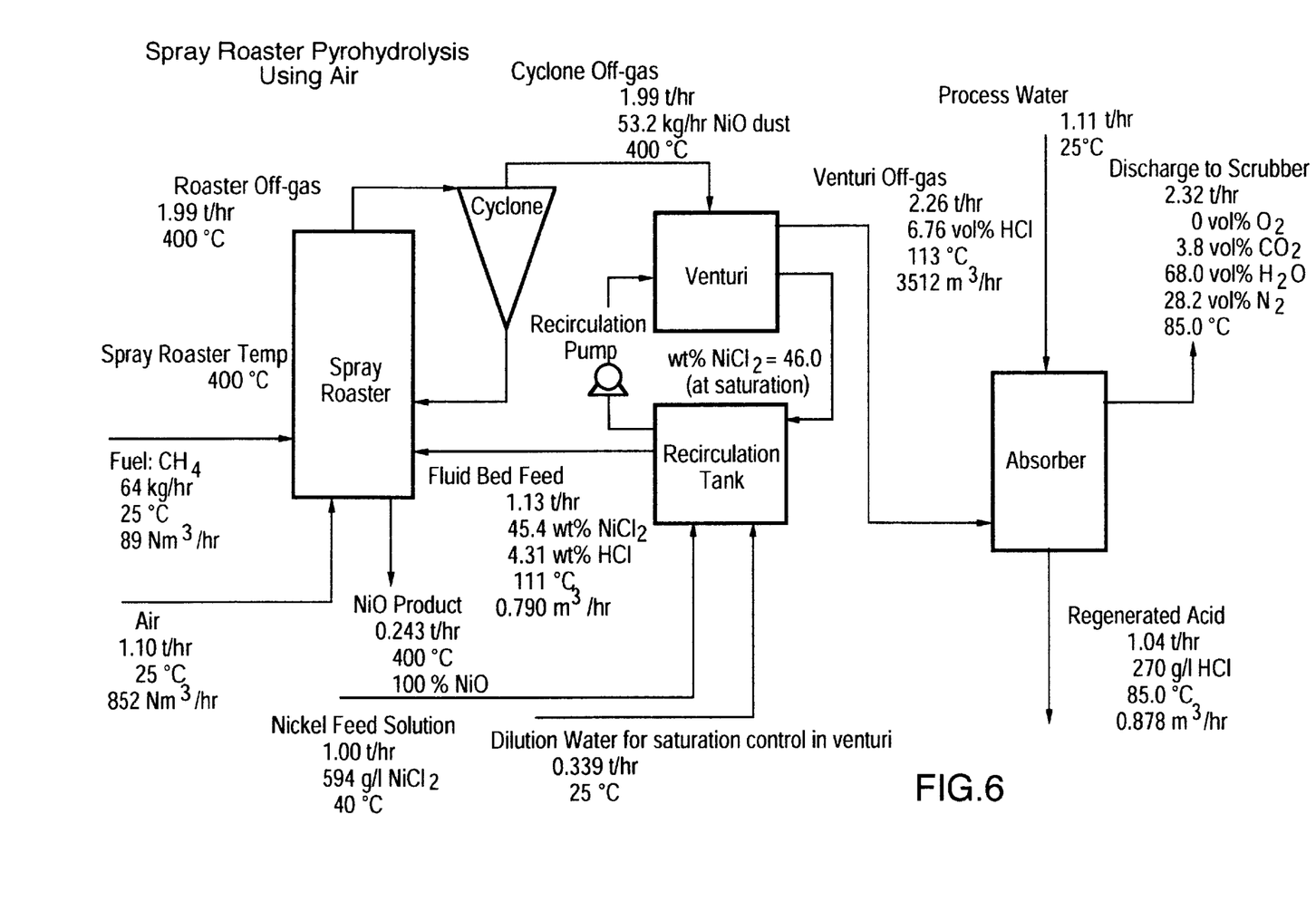
FIG. 6 is a flow diagram illustrating a prior art process and apparatus for spray roaster pyrohydrolysis using air as the oxidizing gas, as exemplified by Example 3.

Similarly, 1 tonne/hr nickel solution containing 594 g/l of NiCl$_2$ is fed at 40° C. into a spray roaster as shown in FIG. 6. Methane (CH$_4$) is burned in the required stoichiometric amount of air to maintain a temperature of 400° C. inside the roaster. The pyrohydrolysis reactions are:

$$CH_4 + O_2 \rightarrow CO_2 + 2H_2O$$

$$H_2O(l) \rightarrow H_2O(g)$$

$$NiCl_2 + H_2O \rightarrow NiO + 2HCl$$

It is found that 64 kg/hr of fuel, 852 Nm$^3$/hr of air and 339 kg/hr of dilution water are required to produce 243 kg/hr of NiO. The pyrohydrolyser conversion is 82.0%. The venturi off-gas contains 6.76% HCl by volume and the corresponding regenerated acid concentration is 270 g/l HCl. The results of this simulation are illustrated in FIG. 6. The operating conditions and product compositions are summarized in Table 1.

Example 4
Oxygen-enriched Spray Roasting

The same nickel solution as used in Example 3 is fed into an oxygen-enriched spray roaster. The spray roaster is also maintained at 400° C. by burning methane (CH$_4$), however a 96% oxygen-4% nitrogen mixture is used instead of air (refer to FIG. 7). The pyrohydrolysis reactions are listed in Example 3.

Figure 7:
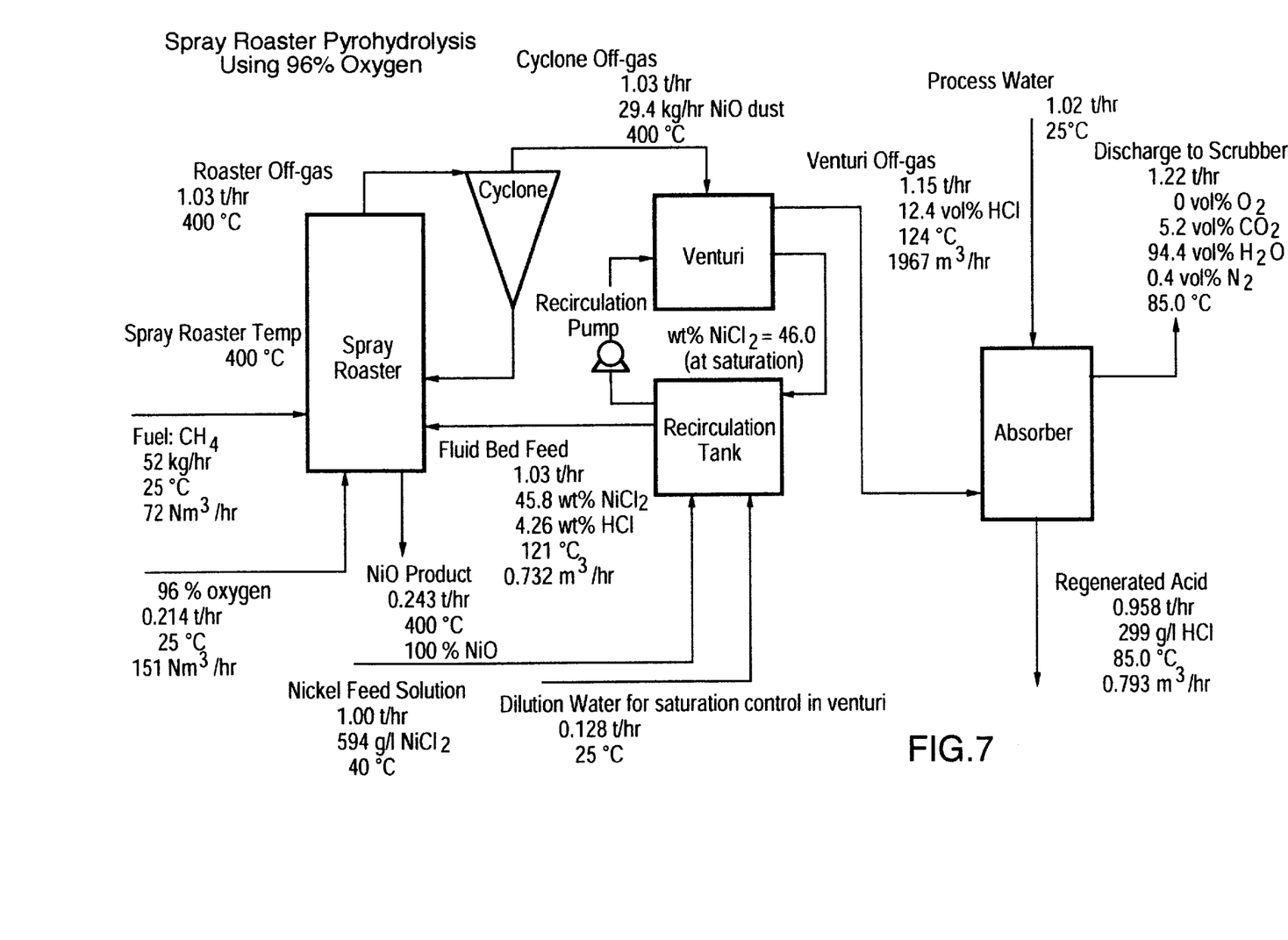
FIG. 7 is a flow diagram illustrating a process and apparatus according to the invention for spray roaster pyrohydrolysis using an oxygen-enriched oxidizing gas, as exemplified by Example 4.

It is found that 52 kg/hr fuel, 151 Nm$^3$/hr of 96% oxygen, and 128 kg/hr of dilution water are required to produce 243 kg/hr of NiO. The pyrohydrolyser conversion is 89.2%. The venturi off-gas contains 12.4% HCl by volume and the corresponding regenerated acid concentration is 299 g/l HCl. FIG. 7 shows the results of the Metsim simulation. The operating conditions and product compositions are summarized and compared to those in Example 3 in Table 1.

The results from the preceding examples are compared in Table 1.

No heat losses have been incorporated in the above examples, which results in somewhat higher off-gas temperatures than in actual plants. Oxygen-enriched roasting requires smaller equipment than air roasting because of the reduced volume of off-gases. Less heat loss is associated with smaller equipment, making oxygen-enriched roasting even more energy efficient than air roasting.

Oxygen-enriched pyrohydrolysis also requires blowers and fans with lower duties, leading to equipment (capital) and electricity (operating) savings that can further off-set the cost of the oxygen-enrichment.

Although the invention has been described in connection with certain preferred embodiments, it is not intended to be limited thereto. Rather, the invention includes all embodiments which may fall within the scope of the following claims.

What is claimed is:

1. A process for forming an aqueous acid halide-containing leachant from a spent aqueous metal halide leach liquor, comprising:
   (a) introducing a hydrocarbon fuel and an oxygen-enriched oxidizing gas into a fluidized bed reactor having a lower portion in which a hot bed containing particles of a metal oxide is maintained in a fluid state;
   (b) combusting the hydrocarbon fuel with the oxygen-enriched oxidizing gas in the hot bed;
   (c) introducing the spent aqueous metal halide leach liquor into the reactor;
   (d) pyrohydrolyzing the aqueous metal halide leach liquor in the reactor to produce an acid halide-containing gas fraction and a solid fraction containing particles of said metal oxide;
   (e) separating the gas fraction from the solid fraction;
   (f) recovering heat energy from the gas fraction; and
   (g) absorbing the gas fraction in water to produce said aqueous acid halide leachant.

2. The process of claim 1, wherein the hot bed containing said metal oxide particles is maintained in a fluid state by the hydrocarbon fuel, the oxygen-enriched oxidizing gas and by gases produced by combustion of the fuel.

3. The process of claim 1, wherein the spent aqueous metal halide leach liquor is introduced into an upper freeboard section of the fluidized bed reactor, above the hot bed containing said metal oxide particles, the leach liquor being introduced through injection lances.

4. The process of claim 1, wherein the spent aqueous metal halide leach liquor is introduced into the reactor at a level of the hot bed containing said metal oxide particles.

TABLE 1

Comparison of Results from Examples

| Parameter | Example 1 Using Air | Example 2 Using 96% O$_2$ | % Difference | Example 3 Using Air | Example 4 Using 96% O$_2$ | % Difference |
|---|---|---|---|---|---|---|
| Feed Solution (1 t/hr), g/l NiCl$_2$ | 594 | 594 | same | 594 | 594 | same |
| Dilution Water, t/hr | 1.36 | 0.490 | −64.0% | 0.339 | 0.128 | −62.2% |
| Fuel (CH$_4$), kg/hr | 121 | 73 | −39.7% | 64 | 52 | −18.8% |
| Air or O$_2$ Flow, Nm$^3$/hr | 1,609 | 212 | −86.8% | 852 | 151 | −82.3% |
| HCl in Venturi Off-gas, vol % | 3.41 | 8.46 | 148% | 6.76 | 12.4 | 83.4% |
| Regenerated Acid Conc., g/l HCl | 238 | 280 | 17.6% | 270 | 299 | 10.74% |
| Gas Discharge to Atmosphere, m$^3$/hr | 6,989 | 2,892 | −58.6% | 3,512 | 1,967 | −44.0% |
| Pyrohydrolyser Conversion (%) | 74.7 | 88.1 | 17.9% | 82.0 | 89.2 | 8.78% |

5. The process of claim 1, wherein the halide is selected from the group comprising chloride and fluoride.

6. The process of claim 5, wherein the halide is chloride.

7. The process of claim 1, wherein the metal in the metal halide is selected from one or more members of the group comprising iron, nickel, magnesium, calcium and cobalt.

8. The process of claim 7, wherein the metal is iron.

9. The process of claim 1, wherein said spent aqueous metal halide leach liquor contains one or more metal chlorides selected from the group comprising nickel chloride and iron (II) chloride.

10. The process of claim 1, wherein said step (f) comprises contacting the acid halide-containing gas fraction with the spent aqueous metal halide leach liquor prior to pyrohydrolysis in said step (d), thereby heating and concentrating the leach liquor.

11. The process of claim 10, wherein said steps (e) and (f) are at least partially performed in a direct contact venturi off-gas cooler and cleaner.

12. The process of claim 11, wherein the sufficient heat energy is recovered from the acid halide-containing gas fraction during said step (f) such that it is cooled to about 100° C.

13. The process of claim 1, wherein said step (g) is performed in a counter-current absorption tower.

14. A process for forming an aqueous acid halide-containing leachant from a spent aqueous metal halide leach liquor, comprising:
(a) combusting a hydrocarbon fuel with an oxygen-enriched oxidizing gas in a spray roaster, the combustion taking place in one or more burners mounted to sides of a spray chamber in a lower portion of the spray roaster;
(b) spraying droplets of said spent aqueous metal halide leach liquor into the roaster at a location above the one or more burners, such that high temperature combustion gases produced by the one or more burners cause drying of the droplets and pyrohydrolysis of the metal halides contained in the droplets, thereby producing an acid halide-containing gas fraction and a metal oxide-containing solid fraction;
(c) separating the gas fraction from the solid fraction;
(d) recovering heat energy from the gas fraction; and
(e) absorbing the gas fraction in water to produce said aqueous acid halide leachant.

15. A process for forming an aqueous acid halide-containing leachant from a spent aqueous metal halide leach liquor, comprising:
(a) introducing into a reactor a hydrocarbon fuel, an oxygen-enriched oxidizing gas and said aqueous metal halide leach liquor, said oxygen-enriched oxidizing gas containing from 25 to 96 percent by volume oxygen;
(b) pyrohydrolyzing the aqueous metal halide leach liquor in said roaster by combustion of said hydrocarbon fuel with said oxygen-enriched oxidizing gas to produce an acid halide-containing gas fraction and a metal oxide-containing solid fraction;
(c) separating the gas fraction from the solid fraction;
(d) recovering heat energy from the gas fraction; and
(e) absorbing the gas fraction in water to produce said aqueous acid halide leachant.

16. The process of claim 15, wherein the oxidizing gas contains from 50 to 96 percent by volume oxygen.

17. The process of claim 15, wherein the oxidizing gas contains from 80 to 96 percent by volume oxygen.

18. A process for forming an aqueous acid halide-containing leachant from a spent aqueous metal halide leach liquor, comprising:
(a) introducing into a reactor a hydrocarbon fuel, an oxygen-enriched oxidizing gas and said aqueous metal halide leach liquor, said oxygen-enriched oxidizing gas containing oxygen and nitrogen;
(b) pyrohydrolyzing the aqueous metal halide leach liquor in said roaster by combustion of said hydrocarbon fuel with said oxygen-enriched oxidizing gas to produce an acid halide-containing gas fraction and a metal oxide-containing solid fraction;
(c) separating the gas fraction from the solid fraction;
(d) recovering heat energy from the gas fraction; and
(e) absorbing the gas fraction in water to produce said aqueous acid halide leachant.

19. The process of claim 18, wherein the oxidizing gas comprises oxygen-enriched air.

20. The process of claim 18, wherein the oxidizing gas contains from 50 to 96 percent by volume oxygen.

21. The process of claim 18, wherein the oxidizing gas contains from 80 to 96 percent by volume oxygen.

* * * * *